(12) United States Patent
Nam et al.

(10) Patent No.: US 9,346,904 B2
(45) Date of Patent: May 24, 2016

(54) THERMOPLASTIC LIGNIN CONDENSATION POLYMER, AND PREPARATION METHOD THEREFOR

(71) Applicants: Jae-Do Nam, Seoul (KR); Dong Kwan Kim, Seoul (KR)

(72) Inventors: Jae-Do Nam, Seoul (KR); Dong Kwan Kim, Seoul (KR); Jung Hoon Nam, Seoul (KR)

( * ) Notice: Subject to any disclaimer, the term of this patent is extended or adjusted under 35 U.S.C. 154(b) by 0 days.

(21) Appl. No.: 14/426,737

(22) PCT Filed: Sep. 6, 2013

(86) PCT No.: PCT/KR2013/008095
§ 371 (c)(1),
(2) Date: Mar. 7, 2015

(87) PCT Pub. No.: WO2014/038896
PCT Pub. Date: Mar. 13, 2014

(65) Prior Publication Data
US 2015/0225498 A1    Aug. 13, 2015

(30) Foreign Application Priority Data

Sep. 7, 2012   (KR) .................. 10-2012-0099291

(51) Int. Cl.
| | | |
|---|---|---|
| *C08H 8/00* | (2010.01) | |
| *C08F 220/10* | (2006.01) | |
| *C07G 1/00* | (2011.01) | |
| *C08H 7/00* | (2011.01) | |
| *C08L 97/00* | (2006.01) | |
| *C08J 5/00* | (2006.01) | |
| *C08K 3/04* | (2006.01) | |
| *C08K 3/34* | (2006.01) | |

(52) U.S. Cl.
CPC ............ *C08F 220/10* (2013.01); *C07G 1/00* (2013.01); *C08H 6/00* (2013.01); *C08J 5/00* (2013.01); *C08K 3/04* (2013.01); *C08K 3/34* (2013.01); *C08L 97/005* (2013.01); *C08K 2003/045* (2013.01); *Y10S 977/742* (2013.01)

(58) Field of Classification Search
CPC ...... C08G 63/08; C08G 63/912; C08L 75/06; C08L 67/04
See application file for complete search history.

(56) References Cited

U.S. PATENT DOCUMENTS

| | | | |
|---|---|---|---|
| 2009/0069550 A1* | 3/2009 | Belanger et al. .............. | 530/507 |
| 2011/0054154 A1 | 3/2011 | Park et al. | |
| 2011/0274612 A1 | 11/2011 | Wohlmann | |

FOREIGN PATENT DOCUMENTS

| | | |
|---|---|---|
| JP | 11-029647 A | 2/1999 |
| JP | 11-071401 A | 3/1999 |
| JP | 2012-515241 A | 7/2012 |
| KR | 1991-0018395 A | 11/1991 |
| KR | 10-0242886 B1 | 2/2000 |
| WO | 2012/038259 A1 | 3/2012 |

OTHER PUBLICATIONS

Hatakeyama, T., et al.; Polymer, 2002, p. 1177-1182.*
Luong, N. D., et al.; Polymer Bulletin, published online Dec. 17, 2011, p. 879-890.*
Oliveira, W., et al.; Macromolecules, 1994, p. 5-11.*
Szycher, M.; Szycher's Handbook of Polyurethanes, 1999, p. 3-1 to 3-7.*
Tien, Y.I., et al.; Polymer, 2001, p. 3213-3221.*
Hefetz, A., et al.; Science, 1979, p. 415-417.*
Furstner, A., et al.; Journal of Organic Chemistry, 1996, p. 3942-3943.*
Witt, T., et al.; Green Chemistry, 2013, p. 2361-2364.*
Duda, A., et al.; Macromolecules, 2002, p. 4266-4270.*
Supplementary European Search Report from corresponding European Patent Application No. 13835036.8 dated Jan. 25, 2016 (6 pages).

* cited by examiner

*Primary Examiner* — Robert Jones, Jr.
(74) *Attorney, Agent, or Firm* — Dardi & Herbert, PLLC; Peter Dardi (57) ABSTRACT

The present invention provides a thermoplastic lignin polycondensate. The thermoplastic lignin polycondensate produces no fumes and odor even at a normal melt processing temperature. The melt viscosity of the thermoplastic lignin polycondensate can be measured even when heated to 200° C. or more. The thermoplastic lignin polycondensate can be prepared by selectively activating the hydroxyl reactive groups of lignin to suppress the crosslinking reaction of the hydroxyl reactive groups, which allows a linear or grafted linear growth of the lignin polycondensate.

7 Claims, 6 Drawing Sheets

THERMOPLASTIC LIGNIN CONDENSATION POLYMER, AND PREPARATION METHOD THEREFOR

This application is a national phase filing of PCT Application No. PCT/KR2013/008095 to NAM et al., filed Sep. 6, 2013, entitled "THERMOPLASTIC LIGNIN CONDENSATION POLYMER, AND PREPARATION METHOD THEREFOR," which claims priority to Korean Patent Application No. 10-2012-0099291 filed on Sep. 7, 2012, which are hereby incorporated herein by reference.

BACKGROUND OF THE INVENTION

1. Field of the Invention

The present invention relates to a melt processable thermoplastic lignin polycondensate and a method for preparing the same.

2. Description of the Related Art

Lignin, together with cellulose and hemicellulose, is one of the principal constituents of wood and is a polymer of phenylpropanoids that exists in a form bound to carbohydrates other than cellulose. Lignin is a complex polymer of three kinds of different phenylpropanoids as constituent units and has a dendritic structure. The constituent units of lignin are represented by Formulae I to III:

Lignin is estimated to have a molecular formula ranging from $C_{18}H_{24}O_{11}$ to $C_{40}H_{45}O_{18}$ although its exact chemical structure is not still clearly understood.

The contents of lignin in needleleaf and broadleaf trees are appropriately 25-30% and 20-25%, respectively. Lignin is obtained in a large amount as a by-product from biomass production, kraft pulping, and other processes.

Figure 1:
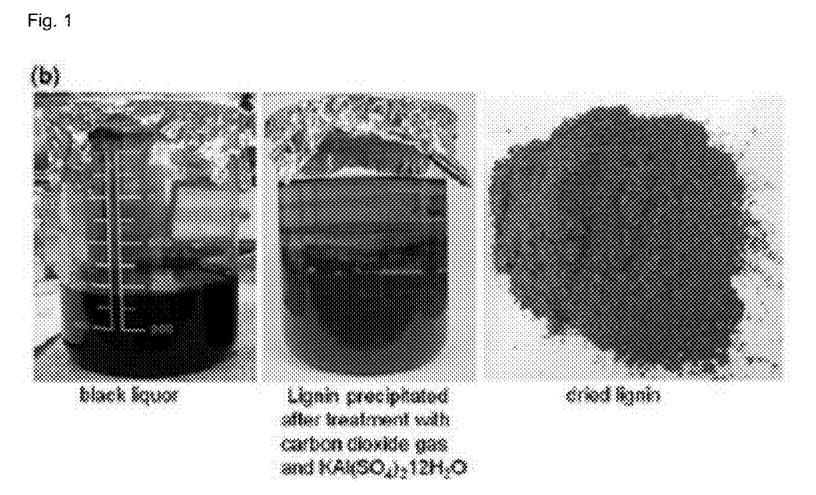
FIG. 1 shows photographs of black liquor as a by-product from the kraft pulping process, black liquor after lignin precipitation, and a lignin powder after final extraction and drying.

For example, lignin may be extracted from black liquor (see FIG. 1). Black liquor refers to a waste produced during wood delignification in the kraft pulping process. Such black liquor contains lignin residues, hemicelluloses, inorganic compounds, etc. dissolved therein.

Roughly 100 million tons of black liquor as a by-product are produced annually worldwide. The treatment of black liquor incurs a considerable cost and causes environmental pollution. For these reasons, black liquor is difficult and troublesome to treat. The content of lignin in black liquor is estimated to be as high as about 30 million tons per year.

At present, almost all (≥99%) lignin extracted around the world is burned to ashes. Only about 1% of lignin is used as a support material for agrochemicals, a concrete additive, a surfactant, an adsorbent, a fertilizer, a rubber additive, a raw material for carbon particles, etc. Attempts have been made to utilize lignin in other applications. For example, lignin degradation products are used as raw materials for phenol-formaldehyde resins. Lignin is blended with commercially available polymers, such as urea-formaldehyde, epoxy resins, polypropylene, and polystyrene. However, lignin lacks thermal stability and the characteristics of thermoplastic polymers, thus being unsuitable for use as a physical additive. Accordingly, a lignin is not widely applicable but extremely small amount of lignin is utilized at laboratory level.

As can be seen in FIG. 1, lignin is obtained as a reddish brown extract from black liquor. The natural lignin extract is a thermosetting polymer and is maintained in the form of a solid due to its lack of thermoplastic properties, thus being impossible to melt process.

Figure 2:
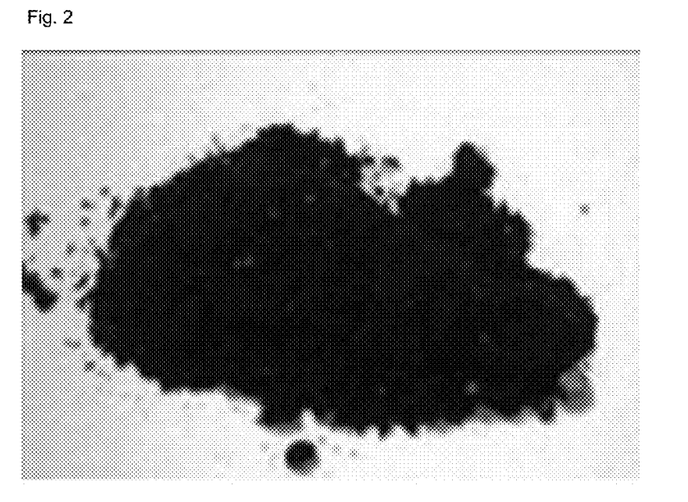
FIG. 2 is a photograph showing the lignin of FIG. 1 when heated to 200° C.

When the lignin extract is heated, it is converted into a black powder (see FIG. 2). That is, the lignin extract evolves odor and fumes and still remains as a powder without being melted when heated. When approaching 100° C., the lignin extract produces odor and fumes due to the presence of low molecular weight molecules. The natural lignin extract is not compatible with general polymers because of its hydrophilic nature, which makes it difficult to obtain excellent physical properties of the lignin extract even when blended with the general polymers.

The reason why it is technically difficult to obtain thermoplastic lignin materials is because lignin has two or more hydroxyl reactive groups. When two or more reactive groups participate in a reaction, three-dimensional crosslinking occurs unavoidably, and as a result, a thermosetting material is produced. As already mentioned, the crosslinked material is impossible to melt process. Lignin obtained from wood extracts by the kraft pulping process is a crosslinked thermosetting material that is not applicable to melt process.

A thermoplastic material refers to a polymer or condensation product that undergoes a phase change to a liquid when heated. A great deal of research is aimed at the development of thermoplastic lignin whose usefulness is expected to expand.

For example, Korean Patent Publication No. 1991-0018395 suggests a method for preparing thermoplastic lignin, including extracting a steam-exploded lignocellulosic material, separating a portion remaining insoluble in water from the lignocellulosic material, extracting the water-insoluble portion with an alcohol or caustic solution, collecting lignin from the extract, and treating the lignin with a halocarbon solvent. This patent publication introduces that the thermoplastic lignin has an average molecular weight ranging from 800 to 1,000 daltons and a melting point ranging from about 125° C. to about 135° C. However, this method is associated with the separation/collection of thermoplastic lig- nin from a natural material. Only a small amount of the thermoplastic lignin is acquired, which is undesirable from an economic viewpoint, and the molecular weight of the thermoplastic lignin is not adjustable. Such physical properties make the thermoplastic lignin unsuitable for commercialization. Another drawback of lignin is poor thermal stability. When heated to 180° C., a normal polymer melt processing temperature, lignin evolves severe fumes and odor accompanied by degradation. Accordingly, the viscosity of lignin is impossible to measure and general processes are impossible to apply to lignin.

Further, International Patent Publication No. WO2012/038259 discloses a method for producing a carbon fiber, including extracting lignin from wood, separating/collecting a thermoplastic portion from the lignin by elution with a solvent, and carbonizing the thermoplastic lignin. Specifically, this patent publication introduces that the thermoplastic lignin has a glass transition temperature of 90 to 160° C., a dispersity of less than 28, an ash content of less than 1% by weight, and a volatile content of less than 1% by weight after high temperature stabilization. However, the lignin is a naturally occurring substance that contains a large amount of a thermosetting portion and a small amount of a thermoplastic portion. Accordingly, this method is disadvantageous from an economic viewpoint. The thermoplastic portion of the natural lignin is water soluble and has a low molecular weight, which are obstacles to its commercialization.

SUMMARY OF THE INVENTION

If natural lignin consisting of thermosetting and thermoplastic portions is converted into thermoplastic lignin by linking the thermosetting and thermoplastic portions through a chemical reaction, the thermoplastic lignin would be very attractive economically and have great utility value. The present invention is therefore intended to provide a thermoplastic lignin polycondensate that is prepared through a chemical reaction of lignin to achieve good thermal stability and low viscosity in a specific range.

One aspect of the present invention provides a thermoplastic lignin polycondensate prepared by reacting a lactone-based compound with lignin and including a structure of Formula 1:

wherein m, n, and p represent the numbers of repeating units and are integers of 1 or greater, and ∿∿∿ is a lignin monomer.

The thermoplastic lignin polycondensate may have a weight average molecular weight of 4,000 to 600,000 and a melt viscosity of 10,000 Pa·s or less at 180° C.

According to a preferred embodiment of the present invention, the thermoplastic lignin polycondensate undergoes a weight loss of 2% or less at 180° C. and has a glass transition temperature or softening temperature of 120° C. to 180° C.

According to a preferred embodiment of the present invention, the main chain of the lignin polycondensate is interrupted by a chain in the form of a copolymer or a graft polymer.

A further aspect of the present invention provides a method for preparing the lignin polycondensate, including reacting a lactone-based compound with lignin to prepare an intermediate.

The method of the present invention may further include polyesterifying the intermediate with a reactant having two or more acid reactive groups selected from acid chlorides, acid dianhydrides, and diacids or reacting the intermediate with at least one reactant selected from the group consisting of reactants having two or more isocyanate reactive groups to form urethane linkages.

The lignin may be obtained by extracting wastes from the kraft pulping process.

According to a preferred embodiment of the present invention, the intermediate reacts with the reactant in a liquid phase in such amounts that the ratio of the equivalents of the reactant to the hydroxyl equivalent weight of the lignin, i.e. the equivalent ratio of the reactant to the lignin, is in the range of 1:1 to 10:1.

According to a preferred embodiment of the present invention, the reaction product further reacts with a diol or polyol in an equivalent ratio of 0.1:1 to 10:1 to interrupt the lignin polycondensate by a chain in the form of a copolymer or a graft polymer or to induce a linear growth of the lignin polycondensate.

The reaction may be carried out without a solvent or in a polar solvent.

The reaction is preferably carried out in the presence of an amine-based catalyst or organometallic catalyst.

Another aspect of the present invention provides a polymer molded product including the lignin polycondensate. Preferably, the polymer molded product includes 100 parts by weight of the polymer and 1 to 60 parts by weight of the lignin polycondensate.

Effects of the Invention

The thermoplastic lignin polycondensate of the present invention is melt processable and is thus applicable to general thermoplastic plastic molding processes, such as extrusion, injection molding, fiber spinning, calendering, vacuum molding, and pressing processes. Therefore, the thermoplastic lignin polycondensate can find application in polymer resins for automobiles, electrical/electronic products, civil engineering and construction materials, and commodities and its demand is thus expected to expand exponentially. The thermoplastic lignin polycondensate of the present invention can be blended with existing polymers, thus being environmentally friendly and contributing to a reduction in material cost. In addition, the use of the thermoplastic lignin polycondensate is expected to bring increased thermal stability, strength, modulus of elasticity, impact strength, softening point, heat distortion temperature, etc.

DETAILED DESCRIPTION OF THE INVENTION

The present invention provides a thermoplastic lignin polycondensate that produces no fumes and odor even at a normal melt processing temperature and whose melt viscosity can be measured even when heated to 180° C. or more.

The thermoplastic lignin polycondensate of the present invention may have a weight average molecular weight of 4,000 to 600,000 and a melt viscosity of 10,000 Pa·s or less at 180° C. The thermoplastic lignin polycondensate is prepared by reacting a lactone-based compound with lignin and includes, in the main chain, a structure of Formula 1:

wherein m, n, and p represent the numbers of repeating units and are integers of 1 or greater, and ∼∼∼ is a lignin monomer.

The index m represents the number of repeating units derived from the lactone-based compound, the index n represents the number of repeating units derived from the lignin, and the index p represents the number of methylene groups in the lactone-based compound. Since the indices m and n can be adjusted depending on the desired molecular weight of the lignin polycondensate, the upper limits thereof are not considered especially significant. The index p is from 1 to 20, preferably from 1 to 10, which is determined by the number of carbon atoms in the lactone-based compound.

The lower limit of the melt viscosity has no special meaning because the lower the melt viscosity, the more preferable it is. It can be specially mentioned that the melt viscosity is at least 1 Pa·s.

The melt viscosity is preferably a value measured using a cone-and-plate or plate-plate rheometer at an angular frequency of 10 rad/s and a heating rate of 5° C./min.

Figure 3:
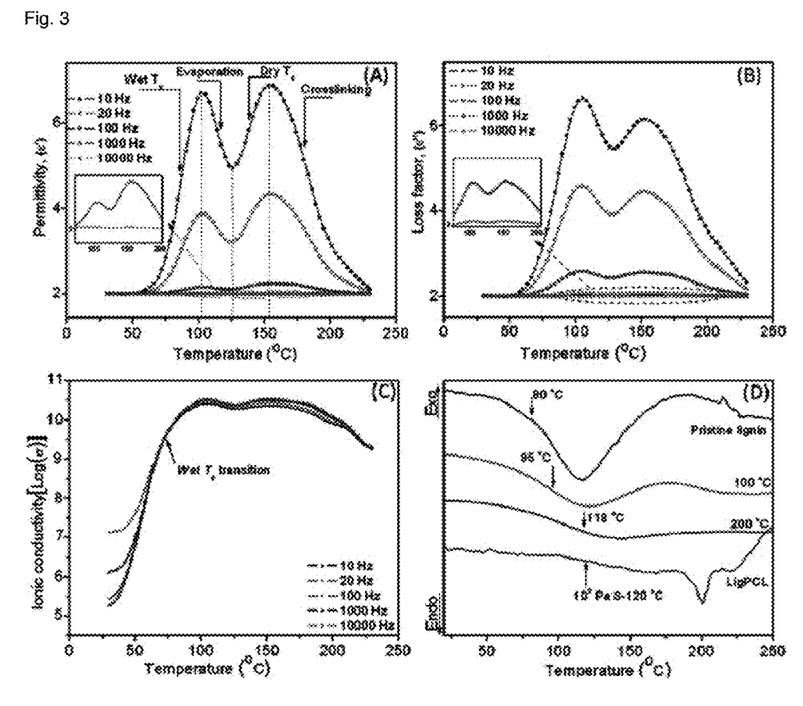
FIG. 3 shows changes in the permittivity (A), loss factor (B), and ionic conductivity (C) of pristine lignin as a function of temperature (temp. rate 3° C./min) at various frequencies, and (D) the results of DSC analysis for the pristine lignin, lignin heated to 100° C., lignin heated to 200° C., and a lignin polycondensate.

Since the glass transition temperature of the thermoplastic lignin polycondensate overlaps the softening temperature of the polymer, the two temperatures are difficult to distinguish by differential scanning calorimetry (DSC). When the glass transition temperature or softening temperature is defined as the temperature at which the permittivity reaches 5, as measured using dielectric analysis at 10 Hz, the glass transition temperature or softening temperature is from 120° C. to 160° C. (see FIG. 3).

The thermoplastic lignin polycondensate of the present invention can be prepared by selectively activating the hydroxyl reactive groups of lignin to suppress the crosslinking reaction of the hydroxyl reactive groups, which allows a linear or grafted linear growth of the lignin polycondensate.

The number of hydroxyl groups in lignin molecules varies depending on the molecular weight of the lignin. When lignin obtained by the kraft pulping process has a molecular weight in the range of 2000 to 3000, it can be considered to have about 15 to about 20 hydroxyl groups. In the present invention, only 2 to 10 of the hydroxyl groups of the lignin molecules are preferably allowed to selectively react to link the lignin molecules. More preferably, 2 to 5 of the hydroxyl groups are allowed to participate in the reaction.

Figure 4:
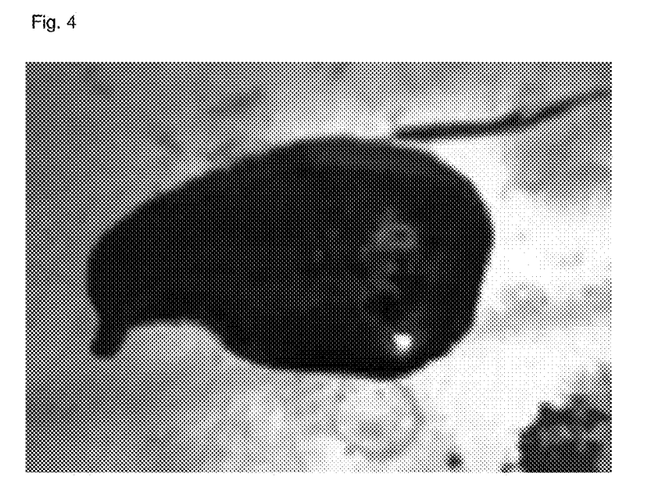
FIG. 4 is a photograph showing a lignin polycondensate according to a preferred embodiment of the present invention when heated to 200° C.

The thermoplastic lignin polycondensate of the present invention is in a molten state at elevated temperature (see FIG. 4). The viscosity of natural lignin whose thermoplastic portion only remains unseparated/uncollected through special pretreatment process is impossible to measure. In contrast, the viscosity of the thermoplastic lignin polycondensate according to the present invention decreases with increasing temperature. Particularly, the thermoplastic lignin polycondensate of the present invention has a low viscosity of 10,000 Pa·s or less at 180° C. or higher, which is a melt processing temperature (see FIG. 5).

Table 1 shows schematic structures and temperature-dependent structural changes of lignin molecules. Table 1 also shows a schematic structure of the thermoplastic lignin polycondensate according to the present invention.

TABLE 1

| Material | Schematic structure | Feature |
|---|---|---|
| Lignin |  High $M_w$ molecular macromonomer / HCH / HCH / HCH / Low $M_w$ macromonomer | Crosslinked low $M_w$ lignin, high $M_w$ lignin, water, impurities |
| Lignin heated to 80-125° C. |  High $M_w$ macromonomer | Low $M_w$ lignin, water evaporation |
| Lignin heated to ≥150° C. |  | Lignin crosslinking |
| Lactone-based compound |  | Optionally used |
| Acid dichloride, acid dianhydride, diacid or isocyanate |  | |
| Thermoplastic lignin polycondensate |  | Thermoplastic, meltable |

According to a preferred embodiment of the present invention, the thermoplastic lignin polycondensate is prepared by reacting the lignin with the lactone-based compound to prepare an intermediate and polyesterifying the intermediate with a reactant having two or more acid reactive groups selected from acid chlorides, acid dianhydrides, and diacids or reacting the intermediate with at least one reactant selected from the group consisting of reactants having two or more isocyanate reactive groups to form urethane linkages, as shown in Table 1. These reactions will be sequentially explained below.

First, according to one embodiment of the present invention, the intermediate may react with a multifunctional acid having two or more acid reactive groups capable of reacting with the hydroxyl groups of the lignin molecules. The multifunctional acid may be selected from acid chlorides, acid dianhydrides, and diacids.

Specific examples of the acid chlorides include succinyl chloride, glutaryl chloride, adipoyl chloride, pimeloyl chloride, suberoyl chloride, azelaoyl chloride, sebacoyl chloride, 1,9-nonanedicarboxylic acid chloride, 1,10-decanedicarboxylic acid chloride, oxalyl chloride, malonyl chloride, isophthaloyl chloride, and terephthaloyl chloride.

Examples of the acid dianhydrides include, but are not limited to, maleic anhydride, pyromellitic dianhydride, 3,3',4,4'-benzophenonetetracarboxylic dianhydride, 1,4,5,8-naphthalenetetracarboxylic dianhydride, 3,4,9,10-perylenetetracarboxylic dianhydride, 3,3',4,4'-biphenyltetracarboxylic dianhydride, 4,4'-oxydiphthalic dianhydride, (4,4'-isopropylidenediphenoxy)bis(phthalic anhydride), and 2,2'-bis(3,4-dicarboxyphenyl)hexafluoropropane dianhydride.

Examples of the diacids include, but are not limited to, terephthalic acid, phthalic anhydride, sebacic acid. methacrylic acid (MAA), succinic acid, dodecanedioic acid, dimer acid, hydrogenated dimer acid, maleic acid, adipic acid, and dilinoleic acid.

On the other hand, examples of the reactants having two or more isocyanate reactive groups capable of reacting with the hydroxyl groups of the lignin molecules to form urethane linkages include, but are not limited to, methylene diisocyanate (MDI), toluene diisocyanate (TDI), isophorone diisocyanate (IPDI), hexamethylene diisocyante (HDI), and xylene diisocyanate (XDI).

According to a preferred embodiment of the present invention, the intermediate reacts with the reactant in a liquid phase in such amounts that the ratio of the equivalents of the reactant to the hydroxyl equivalent weight of the lignin, i.e. the equivalent ratio of the reactant to the lignin, is in the range of 1:1 to 10:1.

According to a preferred embodiment of the present invention, the reaction product further reacts with a diol or polyol in an equivalent ratio of 0.1:1 to 10:1 to interrupt the lignin polycondensate by a chain in the form of a copolymer or graft polymer or induce a linear growth of the lignin polycondensate.

Examples of such diols or polyols include, but are not limited to, diethylene glycol, 1,4-butanediol, dipropylene glycol, polyethylene glycol, polyester polyol, glycerol, 1,2,4-butanetriol, 1,2,6-trihydroxyhexane, and 1,1,1-trishydroxymethylethane.

Specifically, as the lactone-based compound, there may be mentioned, for example, caprolactone. In this case, the lignin is polymerized with caprolactone to give a lignin-based polycaprolactone, as depicted below.

According to a preferred embodiment of the present invention, the thermoplastic lignin polycondensate is prepared by reacting the lignin with the lactone-based compound to prepare an intermediate and polyesterifying the intermediate with a reactant having two or more acid reactive groups selected from acid chlorides, acid dianhydrides, and diacids or reacting the intermediate with at least one reactant selected from the group consisting of reactants having two or more isocyanate reactive groups to form urethane linkages, as shown in Table 1. These reactions will be sequentially explained below.

First, according to one embodiment of the present invention, the intermediate may react with a multifunctional acid having two or more acid reactive groups capable of reacting with the hydroxyl groups of the lignin molecules. The multifunctional acid may be selected from acid chlorides, acid dianhydrides, and diacids.

Specific examples of the acid chlorides include succinyl chloride, glutaryl chloride, adipoyl chloride, pimeloyl chloride, suberoyl chloride, azelaoyl chloride, sebacoyl chloride, 1,9-nonanedicarboxylic acid chloride, 1,10-decanedicarboxylic acid chloride, oxalyl chloride, malonyl chloride, isophthaloyl chloride, and terephthaloyl chloride.

Examples of the acid dianhydrides include, but are not limited to, maleic anhydride, pyromellitic dianhydride, 3,3',4,4'-benzophenonetetracarboxylic dianhydride, 1,4,5,8-naphthalenetetracarboxylic dianhydride, 3,4,9,10-perylenetetracarboxylic dianhydride, 3,3',4,4'-biphenyltetracarboxylic dianhydride, 4,4'-oxydiphthalic dianhydride, (4,4'-isopropylidenediphenoxy)bis(phthalic anhydride), and 2,2'-bis(3,4-dicarboxyphenyl)hexafluoropropane dianhydride.

Examples of the diacids include, but are not limited to, terephthalic acid, phthalic anhydride, sebacic acid. methacrylic acid (MAA), succinic acid, dodecanedioic acid, dimer acid, hydrogenated dimer acid, maleic acid, adipic acid, and dilinoleic acid.

On the other hand, examples of the reactants having two or more isocyanate reactive groups capable of reacting with the hydroxyl groups of the lignin molecules to form urethane linkages include, but are not limited to, methylene diisocyanate (MDI), toluene diisocyanate (TDI), isophorone diisocyanate (IPDI), hexamethylene diisocyante (HDI), and xylene diisocyanate (XDI).

According to a preferred embodiment of the present invention, the intermediate reacts with the reactant in a liquid phase in such amounts that the ratio of the equivalents of the reactant to the hydroxyl equivalent weight of the lignin, i.e. the equivalent ratio of the reactant to the lignin, is in the range of 1:1 to 10:1.

According to a preferred embodiment of the present invention, the reaction product further reacts with a diol or polyol in an equivalent ratio of 0.1:1 to 10:1 to interrupt the lignin polycondensate by a chain in the form of a copolymer or graft polymer or induce a linear growth of the lignin polycondensate.

Examples of such diols or polyols include, but are not limited to, diethylene glycol, 1,4-butanediol, dipropylene glycol, polyethylene glycol, polyester polyol, glycerol, 1,2,4-butanetriol, 1,2,6-trihydroxyhexane, and 1,1,1-trishydroxymethylethane.

Specifically, as the lactone-based compound, there may be mentioned, for example, caprolactone. In this case, the lignin is polymerized with caprolactone to give a lignin-based polycaprolactone as the intermediate, as depicted below:

(Lignin) + (Caprolactone) → Polymerization → (Lignin based polycaprolactone)

The lignin-based polycaprolactone may react with sebacoyl chloride as the acid chloride to prepare a lignin-based polycaprolactone polycondensate as the final product, as depicted below:

(Lignin based polycaprolactone) + (Sebacoyl chloride) → (Polycondensation) −(2n−1) HCl → (Lignin based polycaprolactone polycondensate)

In the present invention, a mixture of the reactant having two or more acid reactive groups, such as an acid chloride, an acid dianhydride or a diacid, or the reactant having two or more isocyanate groups capable of reacting with the lignin may be used to prepare the thermoplastic lignin polycondensate. The reactions may also be carried out in any order. For example, the reaction with the multifunctional acid, the reaction with the polyol, and the reaction with the lignin may be carried out sequentially. Alternatively, the polyol and the lignin may be reacted with the multifunctional acid to grow chains between the lignin molecules. However, there is no particular restriction on the order of the reactions.

The reactants may be allowed to react without a solvent or may be dissolved in a solvent before each reaction. The reactions may be carried out at 60 to 150° C. for 10 minutes to 4 hours. The reaction temperature and time may vary depending on the characteristics of the reactants. The reaction solvent is a polar organic solvent, such as dimethylacetamine or DMSO.

The reactions may be carried out in the presence of a catalyst. The catalyst may be a typical amine-based catalyst or organometallic catalyst. The amine-based catalyst may be, for example, dimethylcyclohexylamine, tetramethylenediamine, pentamethyldiethylenediamine, tetraethylenediamine, triethylamine, tetramethylbutanediamine (TMBDA), pentamethyldipropylenetriamine, N-(3-dimethylaminopropyl)-N,N-diisopropanolamine or 1,3,5-(tris(3-dimethylamino)propyl)hexahydro-s-triazine.

The organometallic catalyst may be, for example, one including mercury, lead, tin (e.g., dibutyltin dilaurate), bismuth (e.g., bismuth octanoate) or zinc.

The lignin polycondensate can be used to produce a composite material. For example, the lignin polycondensate may be blended with a commercial polymer, followed by extrusion or injection molding to produce a composite material.

Specifically, a blend of the lignin polycondensate and a commercial resin, such as polypropylene, polyethylene, polyvinyl chloride or polyethylene terephthalate, may be used to produce a molded product.

Depending on physical properties required in the molded product, the blend may further include a reinforcing material commonly used in the art. Particularly, the blend may use an eco-friendly, naturally occurring fiber, such as a jute, bamboo or cellulose fiber, as a reinforcing material to improve the mechanical properties and flame retardancy of the molded product. The blend may optionally use a nano-reinforcement.

Examples of such nano-reinforcements include montmorillonite, carbon nanotubes, graphene oxide, reduced graphene, and graphene.

The amount of the thermoplastic lignin polycondensate blended with the polymer resin is not particularly limited and may be adjusted depending on the desired physical properties of the molded product. The thermoplastic lignin polycondensate is preferably blended in an amount of 1 to 60 parts by weight, more preferably 5 to 30 parts by weight, based on 100 parts by weight of the polymer resin.

The present invention will be explained in detail with reference to the following examples. These examples are merely illustrative and the scope of the invention is not limited thereto.

EXAMPLE 1

Production of kraft lignin 1000 ml of black liquor (pH 12, Moorim P&P, South Korea) was purged with carbon dioxide at 60° C. for 30 min. As soon as the pH of the solution was adjusted to 9, precipitation began to fall. 5000 ml of 0.2 M alum was added to the solution to reduce the pH to 4 with vigorous stirring. The precipitate was collected by filtration and dried under vacuum for 48 h, affording kraft lignin.

Preparation of lignin polycondensate 2.5 g of the kraft lignin (number average molecular weight 6500, weight average molecular weight 4700) was dissolved in 22.5 ml of dimethylacetamide (DMAc; Junsei Co., Japan) at 60° C. for 1 h and caprolactone (CL) was added to the lignin solution such that the equivalent ratio of $[CL]/[OH]_{lignin}$ was 2. The reaction was carried out at 80° C. Sebacoyl chloride (SC; $C_{10}H_{16}O_2Cl_2$, Sigma-Aldrich) was dissolved at a concentration of 20 wt % in the same solvent.

The two solutions were mixed in such amounts that the equivalent ratio of $[acid]/[OH]_{lignin}$ was 1. To the mixture was slowly added a small amount of triethylamine (TEA; Sam Chun Co., South Korea) as a catalyst. The resulting mixture was stirred under heating at 100° C. As a result of the reaction, a lignin polycondensate was prepared. The lignin polycondensate was found to have a weight average molecular weight of about 9,600.

Viscosity Measurement

Figure 5:
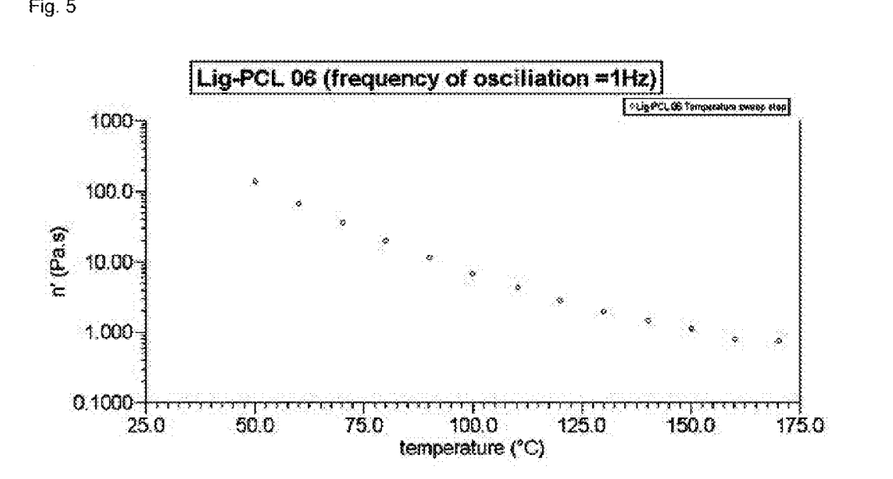
FIG. 5 shows changes in the viscosity of a lignin polycondensate according to a preferred embodiment of the present invention with increasing temperature.

Temperature-dependent changes in the viscosity of the lignin polycondensate prepared in Example 1 were measured using a cone-and-plate rheometer (amplitude gamma=3%, angular frequency omega=10 rad/s, temperature=30-200° C., heating rate=5° C./min). The results are shown in FIG. 5. As can be seen from FIG. 5, the lignin polycondensate had a melt viscosity of 10,000 Pa·s or less at 90° C. and 1,000 Pa·s or less at 180° C. These results demonstrate that the lignin polycondensate is thermoplastic and is thus melt processable.

Weight Loss

Figure 6:
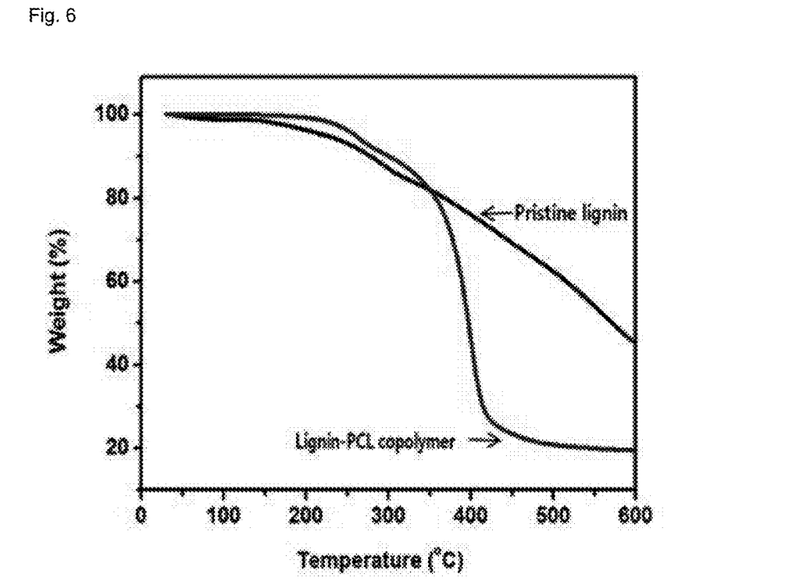
FIG. 6 compares the weight losses of a lignin polycondensate prepared in Example 1 and comparative kraft lignin, which were measured by TGA.

Weight losses of the lignin polycondensate prepared in Example 1 and the comparative kraft lignin were measured by TGA (TGA-2050, TA Instrument Inc.) (see FIG. 6). The kraft lignin underwent a weight loss of 2% at around 80° C. This weight loss was explained by the production of fumes and odor upon heating. In contrast, a weight loss of about 1.5% was observed for the lignin polycondensate of Example 1 when the temperature reached 200° C. It appears that this weight loss arises from the presence of moisture and the occurrence of further polymerization rather than from the degradation of lignin. No weight loss of the lignin polycondensate was detected during processing. These results indicate that the lignin polycondensate is applicable to polymer processes using general polypropylene (PP).

EXAMPLE 2

2.5 g of the kraft lignin (number average molecular weight 6500, weight average molecular weight 4700) was dissolved in 22.5 ml of DMAc at 60° C. for 1 h and caprolactone (CL) was added to the lignin solution such that the equivalent ratio of $[CL]/[OH]_{lignin}$ was 1. The reaction was carried out at 100° C. Maleic anhydride was dissolved in the same solvent.

The two solutions were mixed in such amounts that the equivalent ratio of $[COOH]/[OH]_{lignin}$ was 3. To the mixture was slowly added a small amount of TEA as a catalyst. The resulting mixture was stirred under heating at 100° C. As a result of the reaction, a lignin polycondensate was prepared. The lignin polycondensate was found to have a weight average molecular weight of about 20,000 and a melt viscosity of about 10,000 Pa·s at 180° C.

FT-IR Measurement

Figure 7:
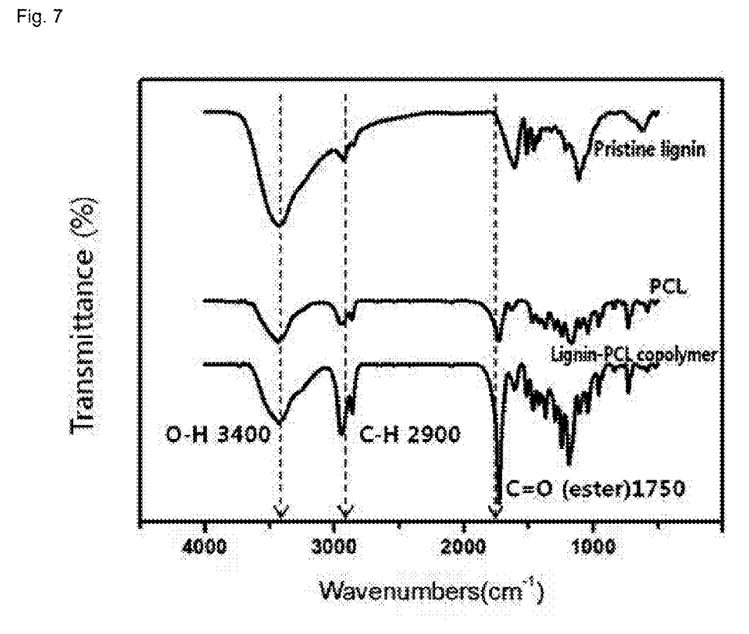
FIG. 7 shows an FT-IR spectrum of a lignin polycondensate prepared in Example 2.

FIG. 7 shows an FT-IR spectrum of the lignin polycondensate prepared in Example 2. The FT-IR spectrum was recorded using a Bruker IFS-66/S spectrometer. The spectrum shows that the hydroxyl groups of the lignin were reacted with caprolactone to form ester groups, demonstrating that the lignin molecules were linked through the ester chains.

EXAMPLE 3

Caprolactone (CL) was added to the lignin solution such that the equivalent ratio of $[CL]/[OH]_{lignin}$ was 2. The reaction was carried out at 80° C., giving a lignin-based polycaprolactone. Subsequently, a sebacoyl chloride (SC) solution was mixed with the lignin-based polycaprolactone at room temperature such that the equivalent ratio of $[COCl]/[OH]_{lignin}$ was 2. To the mixture was slowly added TEA with vigorous stirring such that the molar ratio of TEA/SC was 1. The resulting mixture was kept at 120° C. The reaction mixture was filtered, washed with water, and dried, affording a lignin polycondensate with a weight average molecular weight of about 10,000 and a glass transition temperature of 143° C. The lignin polycondensate was found to have a melt viscosity of 10,000 Pa·s or less at 180° C.

EXAMPLE 4

5 g of the kraft lignin (number average molecular weight 6500, weight average molecular weight 4700) was added to caprolactone (CL) such that the equivalent ratio of $[CL]/[OH]_{lignin}$ was 2. The reaction was carried out at 80° C. Dimethylene diisocyanate was added to the reaction mixture such that the equivalent ratio of $[NCO]/[OH]_{lignin}$ was 3. To the mixture was slowly added a small amount of TEA as a catalyst. 1,4-Butanediol was added in such an amount that the equivalent ratio of the 1,4-butanediol to the lignin was 1:1. The resulting mixture was stirred under heating at 80° C. As a result of the reaction, a lignin polycondensate was prepared. The lignin polycondensate was found to have a weight average molecular weight of about 100,000 and a melt viscosity of about 10,000 Pa·s at 180° C.

PRODUCTION EXAMPLE 1

In this example, composite materials were produced by extrusion and injection molding of the thermoplastic lignin polycondensate of Example 3.

Specifically, polypropylene (HT42, GS Caltex, South Korea), the lignin polycondensate of Example 3, and a jute fiber were blended to have the compositions shown in Table 2. Each blend was dried in an oven at 80° C. for 3 h and mixed and extruded using a twin screw extruder to produce pellets. In Table 2, the contents of the components of the pellets are expressed in parts by weight per 100 parts by weight of the PP.

TABLE 2

|  | Polypropylene (P) | Jute fiber (J) | Lignin (L) | Lignin polycondensate (M) |
|---|---|---|---|---|
| PP | 100 | 0 | 0 | 0 |
| PJ20 | 100 | 20 | 0 | 0 |
| PJ20M5 | 100 | 20 | 0 | 5 |
| PJ20L5M5 | 100 | 20 | 5 | 5 |
| PJ20L5 | 100 | 20 | 5 | 0 |

Figure 8:
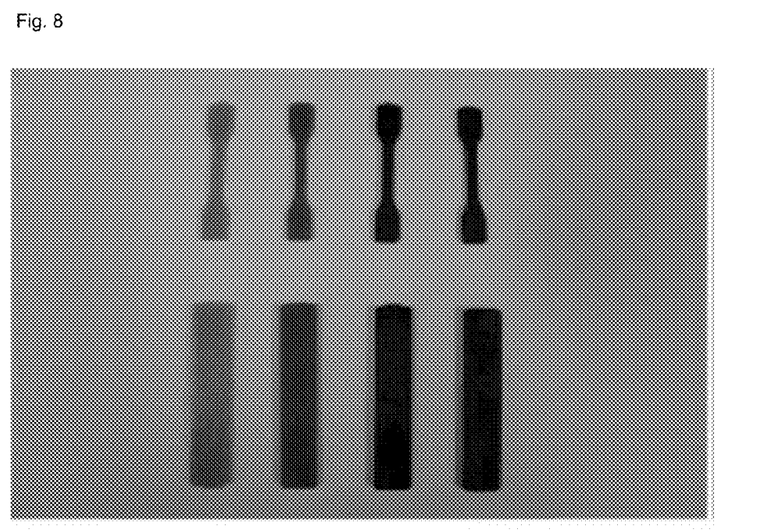
FIG. 8 is a photograph showing samples produced by injection molding of a lignin polycondensate according to the present invention.

The pellets were dried in a vacuum oven at 80° C. for 3 h and injection molded into standard tensile test samples (ASTM D638, Type 1) and Izod bars (ASTM D256) (Sumitomo injection molding machine; Promat 40/SG25A, barrel temperature 200° C., die temperature 210° C.). The shapes of the samples are shown in FIG. 8.

Figure 9:
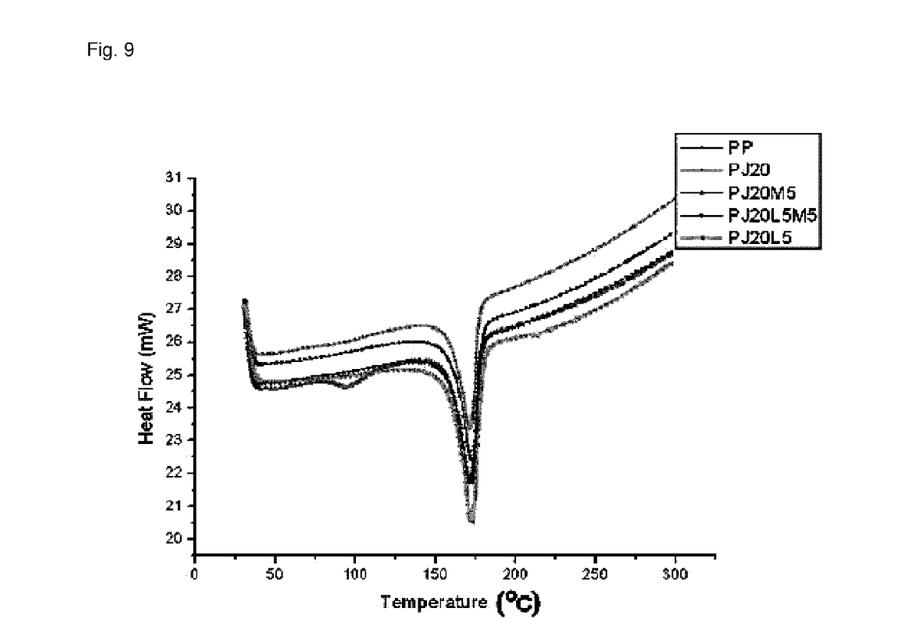
FIG. 9 is a graph showing the melting characteristics of pure polypropylene (PP) and PP composite materials including a lignin polycondensate.

FIG. 9 shows the heats of fusion and melting points of the pure PP material and the PP composite materials, as measured by differential scanning calorimetry (DSC). As can be seen from FIG. 9, the PP composite materials including the lignin polycondensate showed the same melting characteristics as PP.

Evaluation of Mechanical Properties

The composite materials of Production Example 1, which were produced by extrusion and injection molding of the thermoplastic lignin polycondensate of Example 3, were evaluated for mechanical properties in accordance with the general method of ASTM D638.

Figure 10:
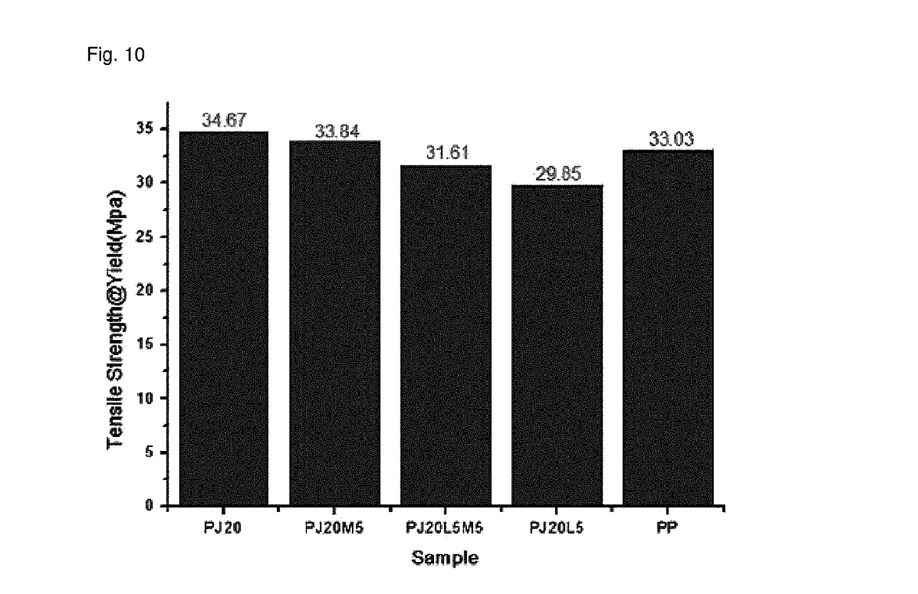
FIGS. 10 to 12 are graphs comparing the tensile strengths, tensile elongations, and tensile moduli of samples containing different amounts of polypropylene, a jute fiber, and a lignin polycondensate.
Figure 11:
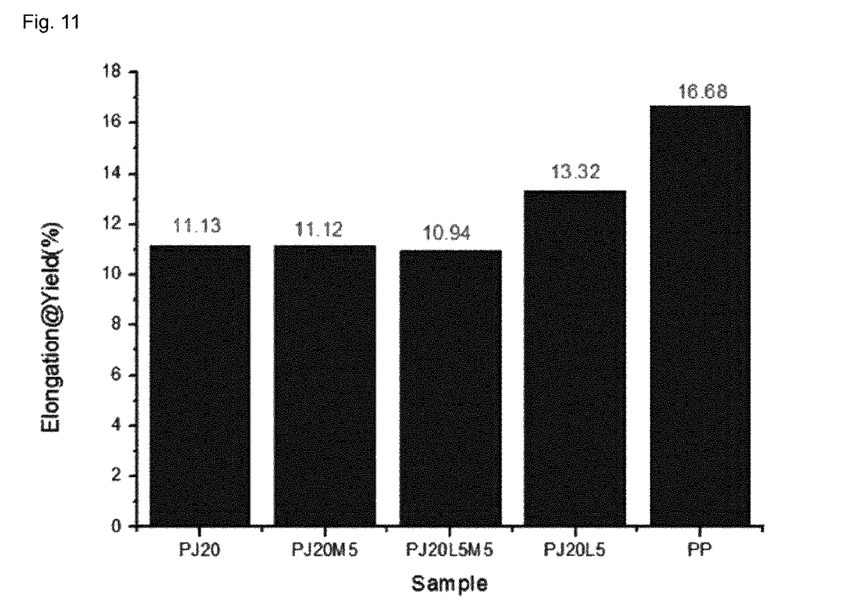
Figure 12:
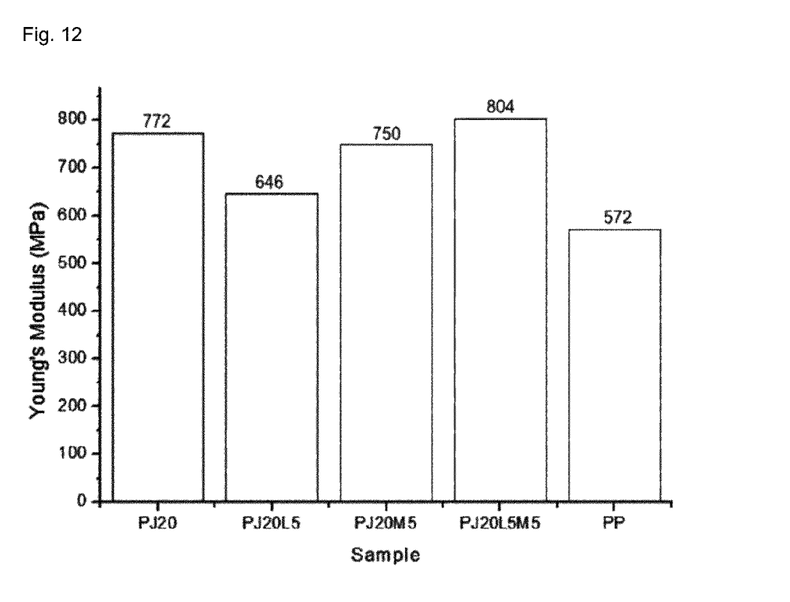

FIGS. 10 to 12 compare the tensile strengths, tensile elongations, and tensile moduli of the samples containing different amounts of the jute fiber and the lignin polycondensate with those of the pure PP material. The tensile strengths and tensile moduli of the samples including the lignin polycondensate and the jute fiber were comparable to or higher than those of the pure PP material. The tensile elongations of the samples including the lignin polycondensate and the jute fiber were slightly lower than the tensile elongation of the pure PP material.

INDUSTRIAL APPLICABILITY

The thermoplastic lignin polycondensate of the present invention is melt processable and is thus applicable to general thermoplastic plastic molding processes, such as extrusion, injection molding, fiber spinning, calendering, vacuum molding, and pressing processes. Therefore, the thermoplastic lignin polycondensate can be applicable to polymer resins for automobiles, electrical/electronic products, civil engineering and construction materials, and commodities and its demand is thus expected to expand exponentially. The thermoplastic lignin polycondensate of the present invention can be blended with existing polymers, thus being environmentally friendly and contributing to a reduction in material cost. In addition, the use of the thermoplastic lignin polycondensate is expected to bring increased thermal stability, strength, modulus of elasticity, impact strength, softening point, heat distortion temperature, etc.

What is claimed is:

1. A method for preparing a lignin polycondensate comprising a structure of formula 1, comprising reacting a lactone-based compound with lignin to prepare an intermediate, and polyesterifying the intermediate with a reactant having two or more acid reactive groups selected from acid chlorides, acid dianhydrides, and diacids;

(1)

wherein m, n, and p represent the numbers of repeating units, m and n are integers of 1 or greater, p is an integer of 1 to 20, and ∿∿∿ is a lignin monomer,
    wherein the thermoplastic lignin polycondensate has a weight average molecular weight of 4,000 to 600,000 and a melt viscosity of 10,000 Pa·s or less at 180° C.; and
    wherein the thermoplastic lignin polycondensate undergoes a weight loss of 2% or less at 180° C. and has a glass transition temperature or softening temperature of 120° C. to 180° C.

2. The method according to claim 1, wherein the intermediate reacts with the reactant in a liquid phase in such amounts that the equivalent ratio of the reactant to the lignin is in the range of 1:1 to 10:1.

3. The method according to claim 1, wherein the reaction product further reacts with a diol or polyol in an equivalent ratio of 0.1:1 to 10:1 to interrupt the lignin polycondensate by a chain in the form of a copolymer or a graft polymer or to induce a linear growth of the lignin polycondensate.

4. The method according to claim 1, wherein the reaction is carried out without a solvent or in a polar solvent.

5. The method according to claim 1, wherein the reaction is carried out in the presence of an amine-based catalyst or organometallic catalyst.

6. The method according to claim 1, wherein the lignin-based compound comprises caprolactone.

7. The method according to claim 1 wherein the main chain of the lignin polycondensate is interrupted by a chain in the form of a copolymer or a graft polymer.

\* \* \* \* \*